United States Patent [19]
Martinez

[11] Patent Number: 5,954,011
[45] Date of Patent: Sep. 21, 1999

[54] PET FEEDING METHOD AND APPARATUS

[76] Inventor: Jesse J. Martinez, 536 Park Glen Dr., Windsor, Calif. 95492

[21] Appl. No.: 09/016,607

[22] Filed: Jan. 30, 1998

[51] Int. Cl.⁶ ........................................... A01K 5/00
[52] U.S. Cl. ................................................. 119/62
[58] Field of Search .................... 119/62, 63, 61, 119/73, 74; 220/908, 252, 334, 367.1, 336; D30/129

[56] References Cited

U.S. PATENT DOCUMENTS

| | | | |
|---|---|---|---|
| 3,219,227 | 11/1965 | Deisner | 220/908 |
| 5,031,796 | 7/1991 | Schafer et al. | 220/571 |
| 5,147,055 | 9/1992 | Samson et al. | 220/254 |
| 5,219,085 | 6/1993 | Craft et al. | 220/252 |
| 5,295,607 | 3/1994 | Chang | 220/407 |
| 5,492,083 | 2/1996 | Holladay | 119/52.1 |
| 5,724,914 | 3/1998 | Nemeth | 119/61 |

*Primary Examiner*—Michael J. Carone
*Assistant Examiner*—James S. Bergin
*Attorney, Agent, or Firm*—Larry D. Johnson

[57] ABSTRACT

A feeding bowl for pets includes a bowl body having a base and a generally hemispherical upper portion, with a hinged panel or door mounted in the upper portion. A pet can insert its head into the bowl body for feeding by moving the hinged door away with its head.

4 Claims, 2 Drawing Sheets

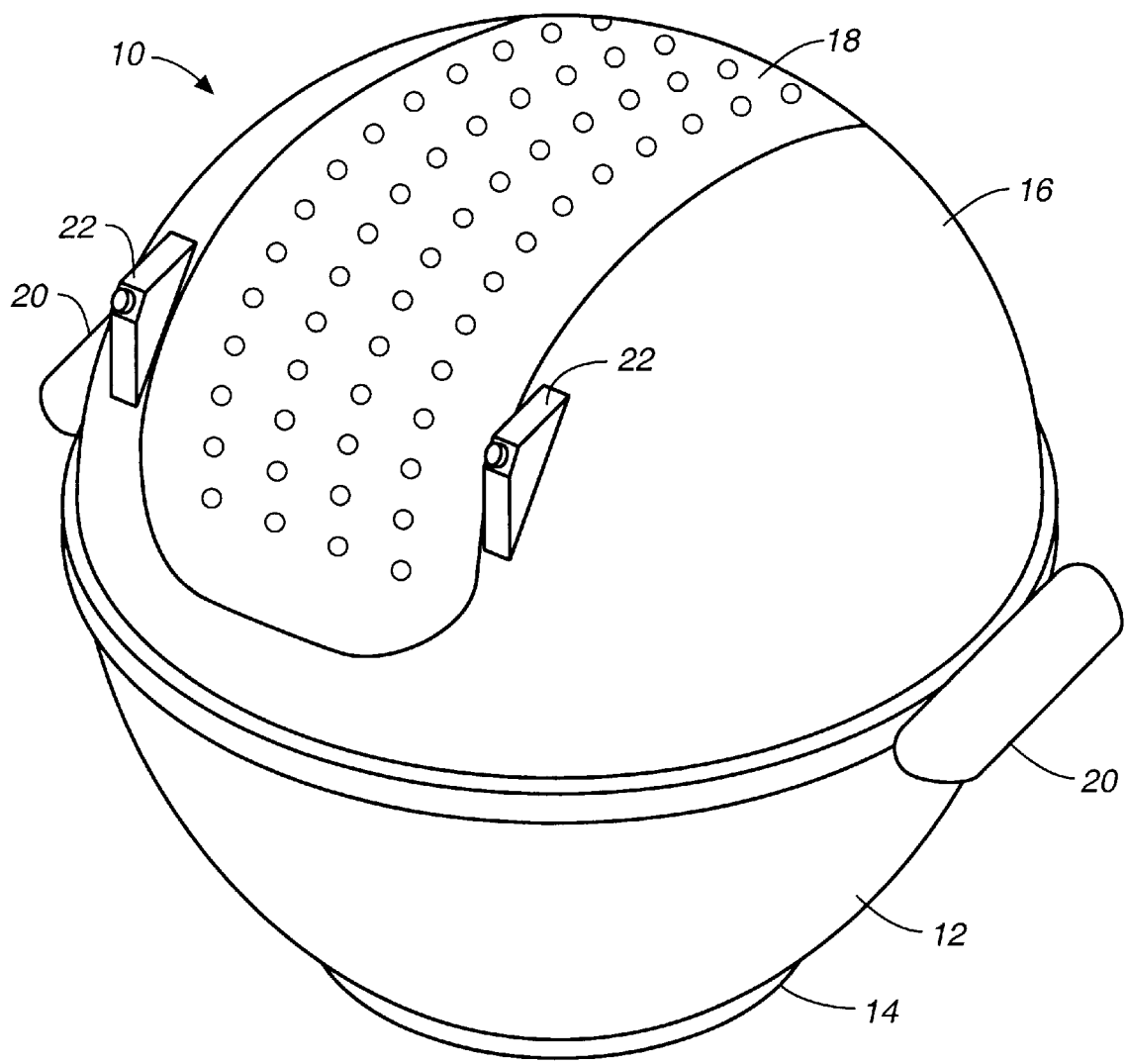
FIG._1

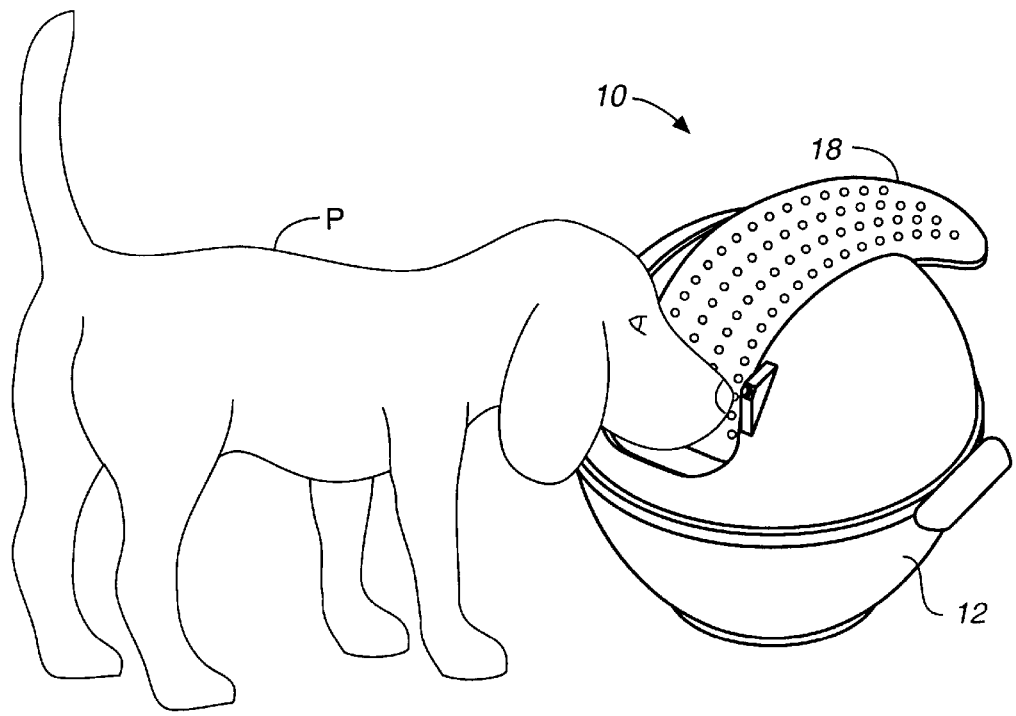
FIG._2
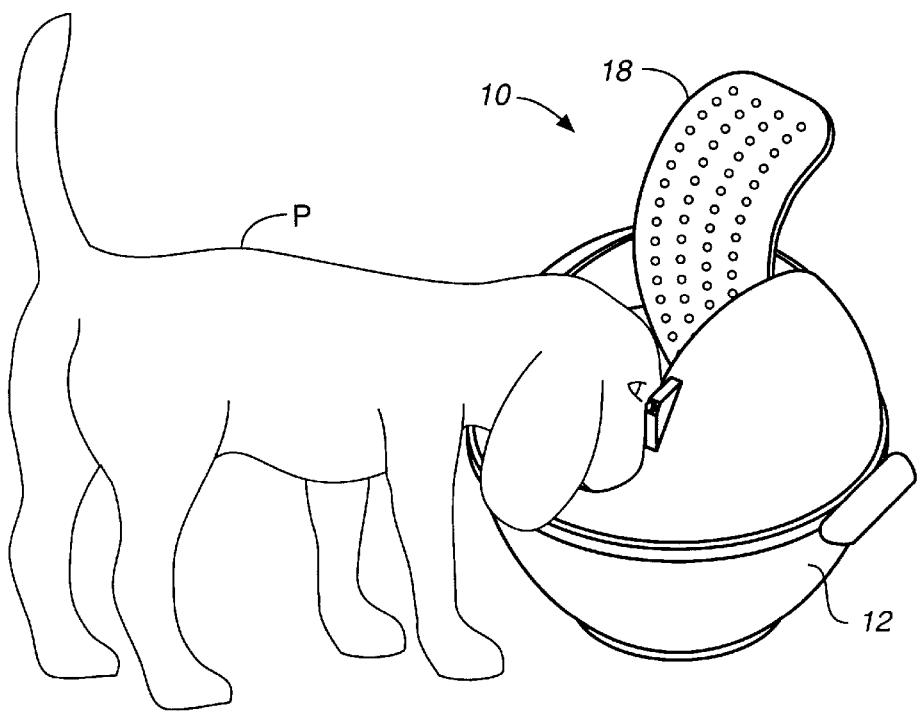
FIG._3

PET FEEDING METHOD AND APPARATUS

BACKGROUND OF THE INVENTION

1. Field of the Invention

This invention relates generally to animal and pet supplies, and more specifically to an improved method for feeding pets.

2. Description of the Prior Art

Pet feeding bowls are well known and in widespread use. Most pet bowls are simply that: a bowl into which food is placed and made available to the pet. Unfortunately, such simple uncovered bowls permit insects, rodents and other vermin to eat the food intended for the pet.

Some covered bowls have been designed to address this problem. However, known covered-type pet bowls are awkward for the pet owner, and difficult for the pet to use.

SUMMARY OF THE INVENTION

The pet feeding method of this invention provides an improved feeding bowl for pets, and a method for its use. The inventive bowl includes a bowl body having a base and a generally hemispherical upper portion, with a hinged panel or door mounted in the upper portion. A pet can insert its head into the bowl body for feeding by moving the hinged door away with its head.

When the animal sticks its head into the bowl to eat, the hinged door in the top portion of the bowl swivels back and away from the animal's head, enabling it to reach the food and eat. Once the animal is finished eating and removes its head from the bowl, the hinged door automatically closes to keep insects and other vermin out.

The inventive bowl preferably includes one handle on each side of the bowl body so that it can be easily carried around. In addition, the bowl may include clips or other fasteners on one or both sides of the top portion of the bowl to releasably lock the hinged door, to prevent any animal (including the pet) from getting into the pet's food. Also, the bowl body may include ornamental or other design features. Still further, the bowl body may be insulated to prevent overheating or overcooling of the pet food contained within. The inventive bowl can be made out of polyethylene plastic or other suitable material, may weigh approximately two pounds, and is easy to use.

The inventive method includes the following steps: the pet owner may simply pour a quantity of pet food into the bowl, and hold the hinged door open for a brief time (e.g., about twenty seconds). The pet can then smell the food and stick its nose and head into the bowl and start eating. The pet owner may then gently release the hinged door toward the pet's head. Most pets should be able to learn to use the inventive bowl on their own in short order.

BRIEF DESCRIPTION OF THE DRAWINGS

FIG. 1 is a front elevation view of a pet feeding apparatus of this invention, illustrating a bowl body having a base and a generally hemispherical upper portion, with a hinged panel or door mounted in the upper portion;

FIG. 2 is a perspective view of the pet feeding apparatus of this invention, illustrating a pet inserting its head into the bowl body by moving the hinged door away with its head; and FIG. 3 is a perspective view of the pet feeding apparatus of this invention, illustrating a pet having fully inserted its head into the bowl body to feed.

DETAILED DESCRIPTION OF A PREFERRED EMBODIMENT

FIG. 1 is a front elevation view of a pet feeding apparatus 10 of this invention, illustrating a bowl body 12 having a base 14 and a generally hemispherical upper portion 16, with a hinged panel or door 18 mounted in the upper portion 16. Hinged door 18 is preferably a partial hemisphere in shape, conforming to the remainder of the upper portion, and is centrally hinged at the top of the upper portion. Door 18 may include perforations to permit venting of the contents of the bowl body, if desired.

The bowl preferably includes one handle 20 on each side of the bowl body 12 for ease in carrying. Clips or other fasteners 22 on one or both sides of the upper portion releasably lock the hinged door 18 to prevent access into the bowl body by any animal (including the pet).

FIG. 2 is a perspective view of the pet feeding apparatus 10 of this invention, illustrating a pet P inserting its head into the bowl body 12 by moving the hinged door 18 away with its head.

FIG. 3 is a perspective view of the pet feeding apparatus 10 of this invention, illustrating the pet P having fully inserted its head into the bowl body 12 to feed.

The inventive method preferably includes the following steps: providing a bowl body having a base connected to a generally hemispherical upper portion with a hinged panel mounted in the upper portion; providing a quantity of pet food into the bowl body; and placing the bowl body in the presence of a pet, wherein the pet can insert its head into the bowl body for feeding by moving the hinged panel away with its head.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A method for pet feeding, said method comprising the steps of:

providing a bowl body having a base connected to a generally hemispherical upper portion having a top, said upper portion including a partially hemispherical hinged door conforming to the shape of the hemispherical upper portion, said partially hemispherical hinged door centrally hinged at the top of the hemispherical upper portion;

providing a quantity of pet food in the bowl body;

placing the bowl body in the presence of a pet;

holding the hinged door open for a period of time until the pet begins feeding; and releasing the hinged door toward the pet, wherein the pet can insert its head into said bowl body for feeding by pivoting said hinged door away with its head.

2. The method for pet feeding of claim 1 further including the step of providing said hinged panel with perforations to permit venting.

3. The method for pet feeding of claim 1 further including the step of providing said bowl body with handles disposed on opposite portions thereof for ease in carrying.

4. The method for pet feeding of claim 1 further including the step of providing said bowl body with fasteners to releasably lock said hinged panel to prevent access into the bowl body.

* * * * *